US008688642B2

(12) United States Patent
Manmohan

(10) Patent No.: US 8,688,642 B2
(45) Date of Patent: Apr. 1, 2014

(54) SYSTEMS AND METHODS FOR MANAGING APPLICATION AVAILABILITY

(75) Inventor: Sarin Sumit Manmohan, Maharashtra (IN)

(73) Assignee: Symantec Corporation, Moutain View, CA (US)

( * ) Notice: Subject to any disclaimer, the term of this patent is extended or adjusted under 35 U.S.C. 154(b) by 347 days.

(21) Appl. No.: 12/713,590

(22) Filed: Feb. 26, 2010

(65) Prior Publication Data

US 2011/0213753 A1 Sep. 1, 2011

(51) Int. Cl.
*G06F 7/00* (2006.01)
*G06F 17/00* (2006.01)

(52) U.S. Cl.
USPC ..... 707/640; 707/661; 707/674; 707/999.204

(58) Field of Classification Search
None
See application file for complete search history.

(56) References Cited

U.S. PATENT DOCUMENTS

| | | | | |
|---|---|---|---|---|
| 6,360,331 B2 * | 3/2002 | Vert et al. | | 714/4.4 |
| 6,363,497 B1 * | 3/2002 | Chrabaszcz | | 714/13 |
| 6,728,896 B1 * | 4/2004 | Forbes et al. | | 714/4.5 |
| 6,857,082 B1 | 2/2005 | Josan et al. | | |
| 7,010,717 B2 * | 3/2006 | Whitlow | | 714/4.11 |
| 7,058,846 B1 * | 6/2006 | Kelkar et al. | | 714/4.4 |
| 7,124,320 B1 * | 10/2006 | Wipfel | | 714/13 |
| 7,213,246 B1 * | 5/2007 | van Rietschote et al. | | 718/1 |
| 7,555,673 B1 * | 6/2009 | Kelkar et al. | | 714/11 |
| 7,689,862 B1 * | 3/2010 | Bharthulwar et al. | | 714/13 |
| 2001/0008019 A1 * | 7/2001 | Vert et al. | | 714/1 |
| 2005/0198552 A1 * | 9/2005 | Baba et al. | | 714/4 |
| 2005/0283636 A1 * | 12/2005 | Vasudevan et al. | | 714/2 |
| 2006/0047776 A1 | 3/2006 | Chieng et al. | | |
| 2010/0088280 A1 * | 4/2010 | Satoyama et al. | | 707/640 |

OTHER PUBLICATIONS

International Search Report and Written Opinion received in PCT Application No. PCT/US2010/060502 on Mar. 23, 2011.

* cited by examiner

*Primary Examiner* — Azam Cheema
(74) *Attorney, Agent, or Firm* — ALG Intellectual Property, LLC

(57) ABSTRACT

A computer-implemented method for managing application availability. The method may include identifying an application running on a first cluster node of a failover cluster and copying configuration data of the application to a storage location accessible by a second cluster node of the failover cluster. The method may also include detecting failure of the first cluster node, restoring the configuration data to the second cluster node, and executing the application on the second cluster node in accordance with the configuration data. Various other methods, systems, and computer-readable media are also disclosed herein.

17 Claims, 5 Drawing Sheets

SYSTEMS AND METHODS FOR MANAGING APPLICATION AVAILABILITY

BACKGROUND

Business continuity and disaster recovery refers to the capability to restore normal (or near-normal) business operations, from a critical business application perspective, after the occurrence of a disaster that interrupts business operations. Business continuity and disaster recovery may require the ability to bring up mission-critical applications and the data these applications depend on and make them available to users as quickly as business requirements dictate. In cases where downtime is costly, the process will likely involve automation. For mission-critical applications that demand minimal downtime, the disaster recovery process may need to be highly automated and resilient. Clustering technologies may provide such highly automated and resilient disaster recovery.

Clusters may include multiple systems connected in various combinations to shared storage devices. Cluster server software may monitor and control applications running in the cluster and may restart applications in response to a variety of hardware or software faults. Unfortunately, many applications may not be configured to run in a cluster environment. What is needed, therefore, is a mechanism for extending clustering technologies to software applications that may not be cluster-aware.

SUMMARY

As will be described in greater detail below, the instant disclosure generally relates to systems and methods for managing application availability. For example, a method for managing application availability may include identifying an application running on a first cluster node of a failover cluster. The method may also include copying configuration data of the application to a storage location accessible by a second cluster node of the failover cluster. The method may further include detecting failure of the first cluster node, restoring the configuration data to the second cluster node, and executing the application on the second cluster node in accordance with the configuration data.

In some embodiments, the method may include receiving a request to start the application on the first cluster node. In such embodiments, identifying the application running on the first cluster node may include receiving the request to start the application, and copying the configuration data of the application may include taking an initial backup of the configuration data. Additionally or alternatively, the method may include determining that the configuration data of the application has changed. In such embodiments, copying the configuration data of the application may be performed in response to the determination that the configuration data of the application has changed. According to various embodiments, determining that the configuration data of the application has changed may include monitoring a directory on the first cluster node that stores the configuration data of the application and detecting a change to data in the monitored directory.

According to at least one embodiment, the method may include receiving a request to stop the application. In such embodiments, identifying the application running on the first cluster node may include receiving the request to start the application and copying the configuration data of the application may include taking a backup of the configuration data after the application is stopped. In certain embodiments, the method may include merging the restored configuration data with configuration data of the application that is already stored on the second cluster node. In at least one embodiment, the application may include a non-cluster-aware application.

In some embodiments, a system for managing application availability may include an identification module programmed to identify an application running on a first cluster node of a failover cluster. The system may also include a monitoring module programmed to copy configuration data of the application to a storage location accessible by a second cluster node of the failover cluster. The system may further include a first cluster agent installed on the first cluster node and programmed to communicate with the monitoring module. The system may include a second cluster agent installed on the second cluster node and programmed to detect failure of the first cluster node, restore the configuration data to the second cluster node, and execute the application on the second cluster node in accordance with the configuration data.

In some embodiments, the first cluster agent may be further programmed to receive a request to start the application on the first cluster node, the identification module may be programmed to identify the application running on the first cluster node by receiving the request to start the application, and the monitoring module may be programmed to copy the configuration data of the application by taking an initial backup of the configuration data.

According to various embodiments, the first cluster agent may be further programmed to determine that the configuration data of the application has changed, and the monitoring module may be programmed to copy the configuration data of the application in response to the determination that the configuration data of the application has changed.

In certain embodiments, the first cluster agent may be programmed to determine that the configuration data of the application has changed by monitoring a directory on the first cluster node that stores the configuration data of the application and by detecting a change to data in the monitored directory. Additionally or alternatively, the first cluster agent may be programmed to receive a request to stop the application, the identification module may be programmed to identify the application running on the first cluster node by receiving the request to start the application, and the monitoring module may be programmed to copy the configuration data of the application by taking a backup of the configuration data after the application is stopped. In at least one embodiment, the second cluster agent may be further programmed to merge the restored configuration data with configuration data of the application that is already stored on the second cluster node.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
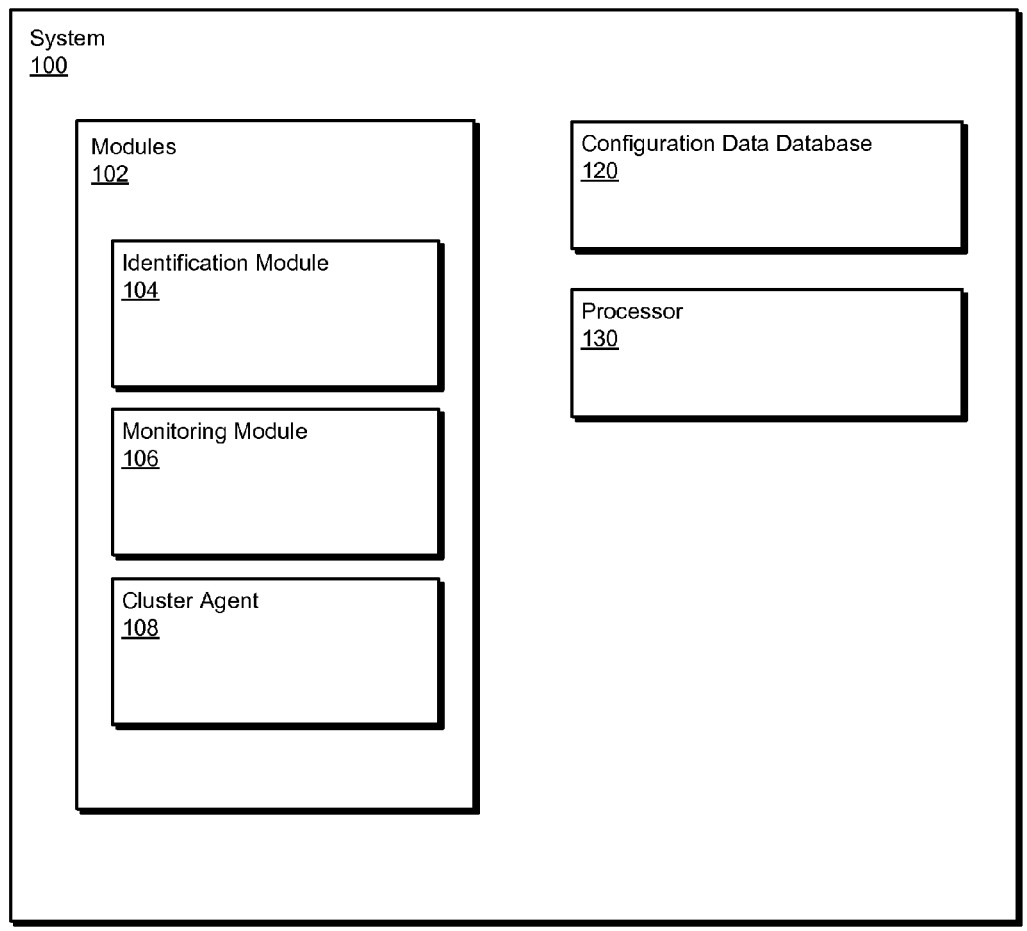
FIG. 1 is a block diagram of an exemplary system for managing application availability.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for managing application availability. Embodiments of the instant disclosure may provide methods and systems for making non-cluster-aware applications highly available by storing application configuration data at a storage location accessible by both a failed cluster node and a failover cluster node. For example, a cluster agent on a first cluster node and may identify locations that contain configuration data of an application. The cluster agent may provide a monitoring module with information that identifies locations containing the configuration data of the application, and the monitoring module may monitor these locations for changes.

When changes are made to data in the monitored locations, the monitoring module may save the configuration data in these locations to the shared storage location that is accessible by the second cluster node. The configuration data may also be copied to the shared storage location in response to other triggers (e.g., when the application starts, when the application is terminated, etc.) If the first cluster node fails, a cluster agent on the second cluster node may access the configuration data from the shared storage location. The application may then be started on the second node using the configuration data.

Figure 2:
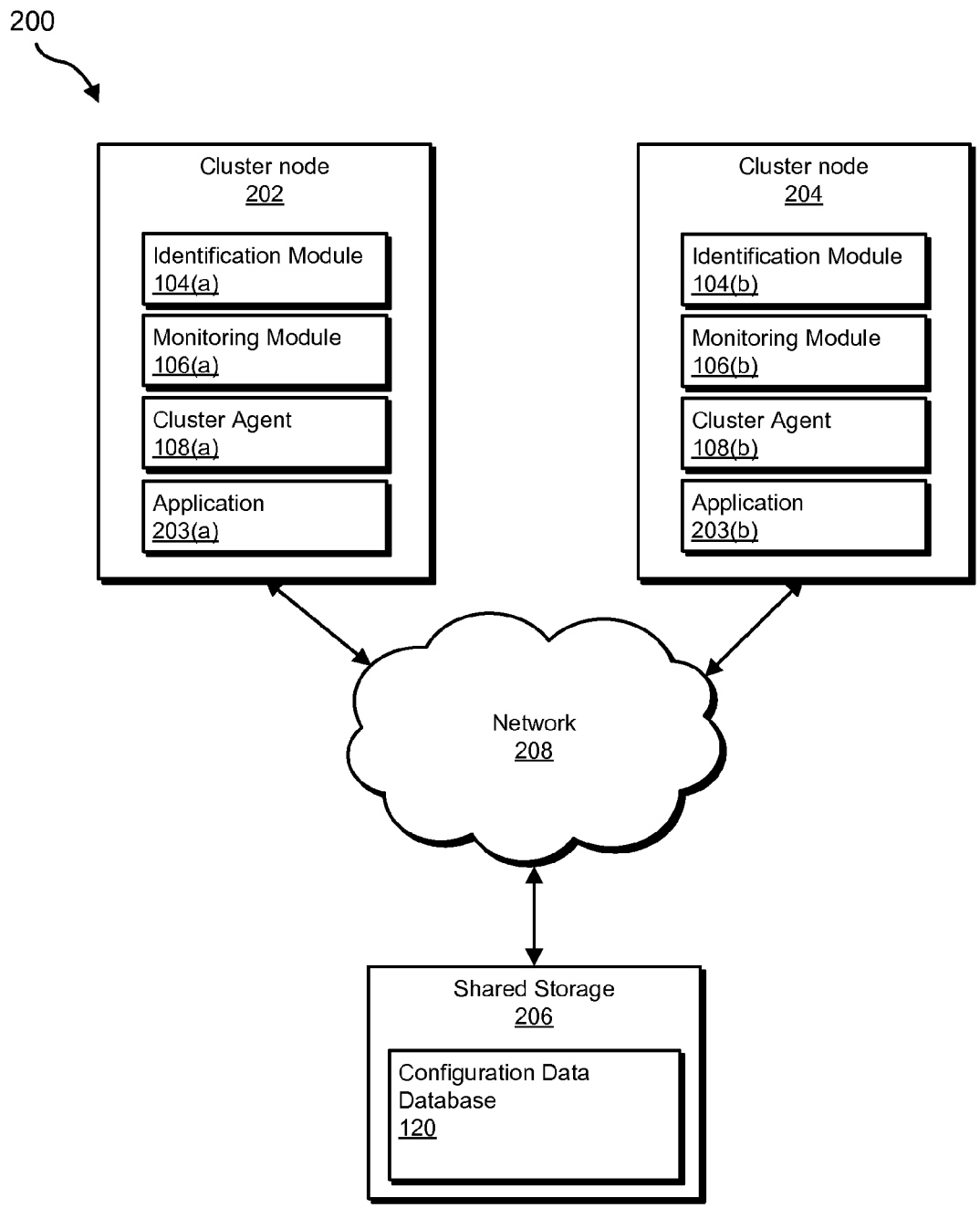
FIG. 2 is a block diagram of an exemplary system for managing application availability.

The following will provide, with reference to FIGS. 1-2, detailed descriptions of exemplary systems for managing application availability. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 4 and 5, respectively.

FIG. 1 is a block diagram of an exemplary system 100 for managing application availability. As illustrated in this figure, exemplary system 100 may include one or more modules 102 for performing one or more tasks. For example, and as will be explained in greater detail below, exemplary system 100 may include an identification module 104 programmed to identify an application running on a first cluster node of a failover cluster. Exemplary system 100 may also include a monitoring module 106 programmed to copy configuration data of the application to a storage location accessible by a second cluster node of the failover cluster.

In addition, and as will be described in greater detail below, exemplary system 100 may include a cluster agent 108 programmed to detect cluster node failure, restore configuration data, and execute applications on cluster nodes. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as the devices illustrated in FIG. 2 (e.g., cluster node 202 and/or cluster node 204), computing system 410 in FIG. 4, and/or portions of exemplary network architecture 500 in FIG. 5. One or more of modules 102 in FIG. 1 may also represent all or portions of one or more special-purpose computers configured to perform one or more tasks.

Cluster agent 108, monitoring module 106, and/or identification module 104 may be part of a cluster monitor or other cluster server software for managing cluster nodes. Examples of cluster server software include VERITAS CLUSTER SERVER, MICROSOFT CLUSTER SERVER, LINUX CLUSTER SERVER, and/or any other suitable type of cluster software. Cluster server software may provide failover clusters (i.e., high-availability clusters), which may be implemented for the purpose of improving availability of services and may operate having redundant nodes which are used to provide service when system components fail.

System 100 may include a processor 130, which may be configured to execute identification module 104, monitoring module 106, and/or cluster agent 108. Processor 130 generally represents any device capable of executing code, such as processor 414 in FIG. 4.

As illustrated in FIG. 1, exemplary system 100 may also include a configuration data database 120. Configuration data database 120 may represent portions of a single database or computing device or a plurality of databases or computing devices. Configuration data database 120 may store configuration data of an application. As used herein, the phrase "configuration data" generally refers to configuration settings and options of an application. Configuration data may include any type or form of settings and options for any type of application.

Configuration data database 120 in FIG. 1 may represent a portion of one or more computing devices. For example, configuration data database 120 may represent a portion of shared storage 206 in FIG. 2, computing system 410 in FIG. 4, and/or portions of exemplary network architecture 500 in FIG. 5. Alternatively, configuration data database 120 in FIG. 1 may represent one or more physically separate devices capable of being accessed by a computing device, such as shared storage 206 in FIG. 2, computing system 410 in FIG. 4 and/or portions of exemplary network architecture 500 in FIG. 5.

Exemplary system 100 in FIG. 1 may be deployed in a variety of ways. For example, all or a portion of exemplary system 100 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

As shown in FIG. 2, system 200 may include cluster nodes 202 and 204 in communication with shared storage 206 via a network 208. Cluster nodes 202 and 204 generally represent any type or form of computing device capable of reading computer-executable instructions. As shown in FIG. 2, cluster node 202 may include an identification module 104(a), a monitoring module 106(a), a cluster agent 108(a), and an application 203(a). Similarly, cluster node 204 may include an identification module 104(b), a monitoring module 106(b), a cluster agent 108(b), and an application 203(b). Shared storage 206 may include configuration data database 120.

In the example shown in FIG. 2, cluster nodes 202 and 204 may represent a cluster. As used herein, the term "cluster node" generally refers to any computing device that is part of a cluster of linked computing devices. Examples of cluster nodes include, without limitation, laptops, desktops, servers, virtual machines, embedded systems, combinations of one or more of the same, exemplary computing system 410 in FIG. 4, or any other suitable computing device or system. Clusters may also include more than two nodes and may be configured to provide high availability for applications (e.g., clusters may include redundant nodes that provide failover capabilities).

As noted, cluster node 202 may include an application 203(a), which may be a non-cluster-aware application. As used herein, the phrase "non-cluster-aware application" generally refers to a software application that is not designed to call cluster Application Programming Interfaces ("APIs"), is not capable of maintaining a cluster heartbeat between nodes, is not capable of transaction processing, is not capable of mirroring cluster information in real-time, and/or is not capable of changing its configuration data path.

Cluster node 202, cluster node 204, and shared storage 206 may communicate over network 208. Network 208 generally represents any medium or architecture capable of facilitating communication or data transfer. Examples of network 208 include, without limitation, an intranet, a Wide Area Network ("WAN"), a Local Area Network ("LAN"), a Personal Area Network ("PAN"), the Internet, Power Line Communications ("PLC"), a cellular network (e.g., a GSM Network), exemplary network architecture 500 in FIG. 5, or the like. Network 204 may facilitate communication or data transfer using wireless or wired connections.

In some embodiments, all or a portion of exemplary system 200 may be implemented in a virtual environment. For example, cluster nodes 202 and 204 may be implemented as virtual machines running as guest systems on two different host systems (i.e., physical machines with virtualization software). Such a configuration may provide high-availability while making possible live migrations of virtual cluster nodes between host systems. In a second example, cluster node 202 may run directly on a physical host system while cluster node 204 runs as a guest system on the same host system. As a third example, both cluster nodes 202 and 204 may run as guest systems on a single host system. The second and third examples may make efficient use of hardware but may also be less useful for providing high-availability.

Figure 3:
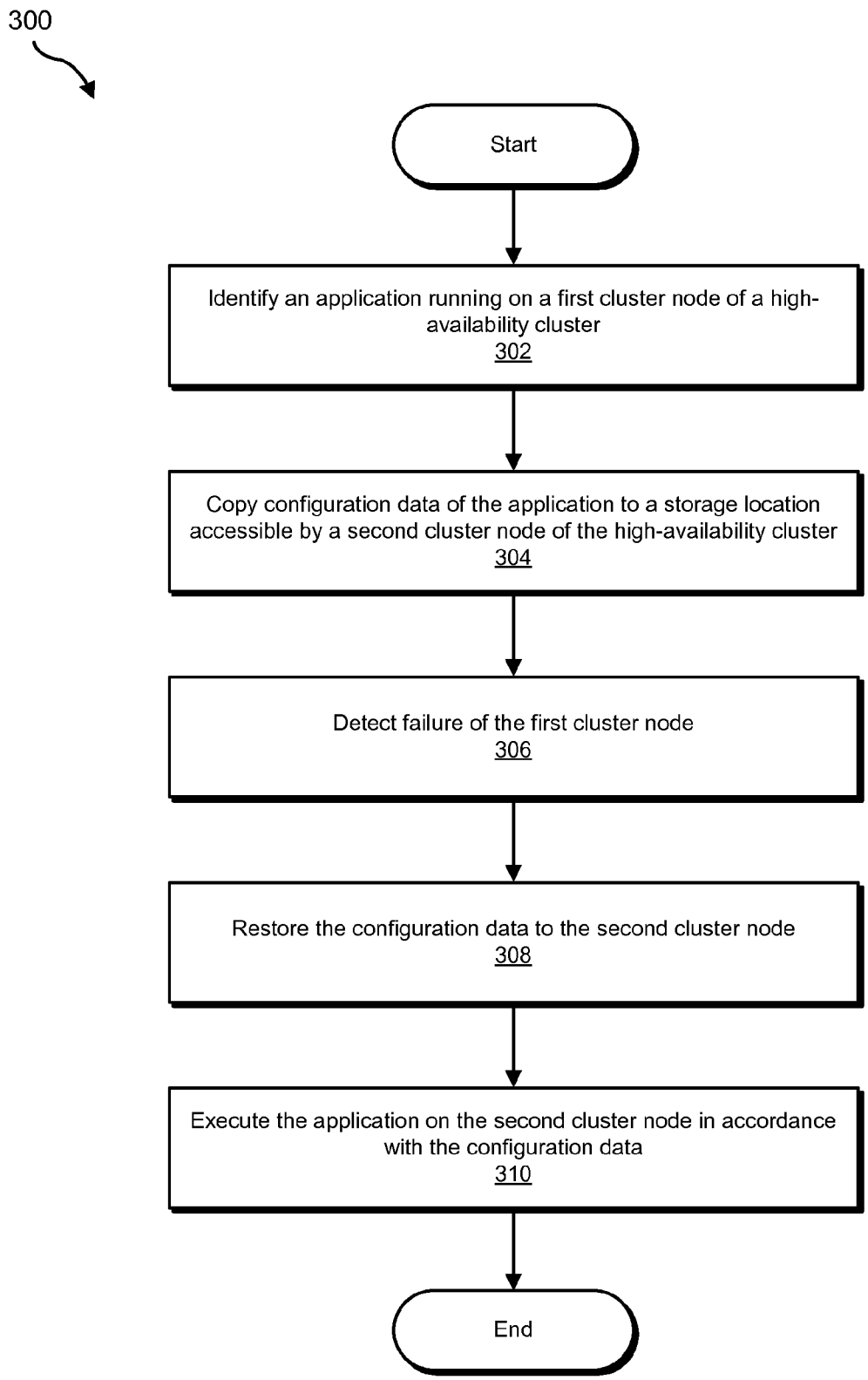
FIG. 3 is a flow diagram of an exemplary method for managing application availability.

FIG. 3 is a flow diagram of an exemplary computer-implemented method 300 for managing application availability. The steps shown in FIG. 3 may be performed by any suitable computer-executable code and/or computing system. In some embodiments, the steps shown in FIG. 3 may be performed by one or more of the components of system 100 in FIG. 1 and/or system 200 in FIG. 2.

At step 302 in FIG. 3, one or more of the systems described herein may identify an application running on a first cluster node of a high-availability cluster. For example, identification module 104(a) may identify application 203(a) running on cluster node 202. Identification module 104(a) may identify application 203(a) in a variety of contexts. For example, identification module 104(a) may identify application 203(a) as part of a request to start or stop application 203(a).

Identification module 104(a) may identify application 203(a) as an application that is not cluster aware and therefore is not programmed or otherwise configured to take advantage of failover capabilities in a traditional cluster environment. After identifying application 203(a) as a non-cluster-aware application, identification module 104(a) may inform monitoring module 106(a) and/or cluster agent 108(a) that configuration data for application 203(a) should be copied to shared storage 206.

At step 304 in FIG. 3, one or more of the systems described herein may copy configuration data of the application to a storage location accessible by a second cluster node of the high-availability cluster. For example, monitoring module 106(a) may copy configuration data of application 203(a) to a storage location (e.g., shared storage 206) accessible by a cluster node 204. The configuration data may be copied in a variety of contexts. In some embodiments, the configuration of data may be copied to a shared storage location when application 203(a) starts. Additionally or alternatively, monitoring module 106(a) may copy configuration data of application 203(a) to shared storage 206 when the configuration data of application 203(a) on cluster node 202 is modified. In some embodiments, monitoring module 106(a) may copy the configuration data of application 203(a) to shared storage 206 when application 203(a) is stopped or otherwise terminated.

As mentioned, the configuration data of application 203(a) may be copied to configuration data database 120 on shared storage 206 at startup of application 203(a). In such an embodiment, cluster agent 108(a) may receive a request to start application 203(a). If shared storage 206 does not include configuration data for application 203(a) when application 203(a) starts, cluster agent 108(a) may prompt monitoring module 106(a) to copy configuration data from application 203(a) to shared storage 206.

If configuration data for application 203(a) is already on shared storage 206, cluster agent 108(a) may apply the configuration data stored on shared storage 206 to application 203(a). For example, cluster agent 108(a) may copy the configuration data in shared storage 206 to a location on cluster node 202 that stores configuration data for application 203(a). In some embodiments, agent 108(a) may replace any configuration data already stored on cluster node 202 with the configuration data from shared storage 206. Alternatively, cluster agent 108(a) may combine configuration data already on cluster node 202 with configuration data from shared storage by performing a differential merge, as will be discussed in greater detail below.

Cluster agent 108(a) may provide information to monitoring module 106(a) that identifies a directory tree, set of directory trees, and/or other locations that store configuration data for application 203(a). Cluster agent 108(a) may also prompt monitoring module 106(a) to begin monitoring the identified locations for changes. Cluster agent 108(a) may communicate with monitoring module 106(a) in any suitable way. For example, cluster agent 108(a) may communicate with monitoring module 106(a) via an inter-process communication (e.g., using shared memory).

Monitoring module 106(a) may register for file change notifications for each directory tree or other location associated with configuration data of application 203(*a*). Monitoring module 106(*a*) may then inform cluster agent 108(*a*) that cluster agent 108(*a*) may start application 203(*a*), and in response, cluster agent 108(*a*) may start application 203(*a*).

When application 203(*a*) is running, configuration data of application 203(*a*) may be copied to shared storage 206 when the configuration data changes. For example, monitoring module 106(*a*) may monitor the locations where the configuration data of application 203(*a*) is stored (e.g., by registering for change notifications, monitoring input and output activity, etc.). If monitoring module 106(*a*) detects that the configuration data of application 203(*a*) has been changed, monitoring module 106(*a*) may back up the configuration data of application 203(*a*) to shared storage 206.

Configuration data may also be copied to a shared storage location when application 203(*a*) is stopped. In such embodiments, cluster agent 108(*a*) may receive a request to stop application 203(*a*). Cluster agent 108(*a*) may then inform monitoring module 106(*a*) that the application 203(*a*) has stopped, and monitoring module 106(*a*) may back up the configuration data associated with application 203(*a*) to shared storage 206.

At step 306 in FIG. 3, one or more of the systems disclosed herein may detect failure of the first cluster node. For example, cluster agent 108(*b*) may determine that cluster node 202 has failed. Failure of a cluster node may be detected in various ways. In some embodiments, cluster agent 108(*b*) may detect failure of cluster node 202 by determining that one or more resources (e.g., disks, network adapters, file systems, databases, applications, etc.) of cluster node 202 have failed. A failed resource may be a resource that is no longer functioning properly due to a hardware problem, a software problem, being overloaded, and/or any other issue.

In some clusters, resources may be organized into service groups, which are sets of resources that work together to provide application services to clients. In such embodiments, if a resource in a service group on cluster node 202 fails, cluster agent 108(*b*) may begin a failover procedure for the entire service group. In other words, cluster agent 108(*b*) may failover each resource in the service group if cluster agent 108(*b*) detects failure of any resource in the service group.

At step 308 in FIG. 3, one or more of the systems described herein may restore the configuration data to the second cluster. For example, cluster agent 108(*b*) may restore configuration data of application 203(*a*) from shared storage 206 to cluster node 204. The configuration data may be restored in any suitable manner. For example, the configuration data may be copied from configuration data database 120 in shared storage 206 to cluster node 204. In some embodiments, cluster agent 108(*b*) may provide the configuration data to application 203(*b*) (e.g., by copying the configuration data to a memory region that stores registry data for application 203(*b*)) without making any changes to the configuration data.

Alternatively, cluster agent 108(*b*) may merge the configuration data from shared storage 206 with configuration data that is already on cluster node 204. Cluster agent 108(*b*) may merge the configuration data for a variety of reasons and in a variety of ways. For example, if two instances of an application are running—one on cluster nodes 202 and the other on cluster node 204—and the instance running on cluster node 202 fails, the application instance running on cluster node 202 may failover to cluster node 204. To handle the failover, cluster agent 108(*b*) may restore the configuration data from configuration database 120 to cluster node 204 and may merge the restored configuration data with the configuration data already on cluster node 204 (i.e., the configuration data for the instance of the application running on cluster node 204). Cluster agent 108(*b*) may then start a second instance of the application on cluster node 204 and may make the restored configuration data available to the second instance of the application.

Cluster agent 108(*b*) may merge different sets of configuration data in a variety of ways. For example, cluster agent 108(*b*) may perform a differential merge of existing configuration data and restored configuration data by keeping only a single copy of settings and/or options that are the same in the existing and restored configuration data and by keeping both copies of settings and/or options that are different in the existing and restored configuration data. Alternatively, cluster agent 108(*b*) may perform a full merger by combining full copies of both the existing configuration data and the restored configuration data.

In some embodiments, cluster agent 108(*b*) may merge different sets of configuration data by combining the configuration data into a single file. For example, configuration data of an application may be stored in an eXtensible Markup Language ("XML") document. In such embodiments, cluster agent 108(*b*) may merge configuration data by performing a complete or differential merge of two XML documents.

In some embodiments, configuration data may include node-specific information, such as a host name (e.g., cluster node name), a Globally Unique Identifier ("GUID"), or any other type of node-specific information. When a cluster agent restores configuration data with node-specific information to a failover cluster node, the cluster agent may translate the node-specific information. For example, monitoring module 106(*a*) may copy configuration data that includes node-specific information to shared storage 206.

Restoring the configuration data may include translating node-specific information. Node-specific information may be translated to apply to cluster node 204 if the configuration is restored to cluster node 204. Thus, if cluster node 202 fails, cluster agent 108(*b*) may retrieve the configuration data from shared storage 206 and may translate the node-specific information in the configuration data to correspond to cluster node 204 rather than cluster node 202.

At step 310 in FIG. 3, one or more of the systems described herein may execute the application on the second cluster node in accordance with the configuration data. For example, cluster agent 108(*b*) on cluster node 204 may execute application 203(*b*) on cluster node 204 in accordance with the configuration data restored from shared storage 206. Cluster agent 108(*b*) may execute application 203(*b*) in accordance with the configuration data from shared storage 206 by ensuring that application 203(*b*) has access to and/or is configured with the restored configuration data. By restoring configuration data in this manner, the systems described herein may provide high availability to applications that are not configured to failover in traditional cluster environments.

Figure 4:
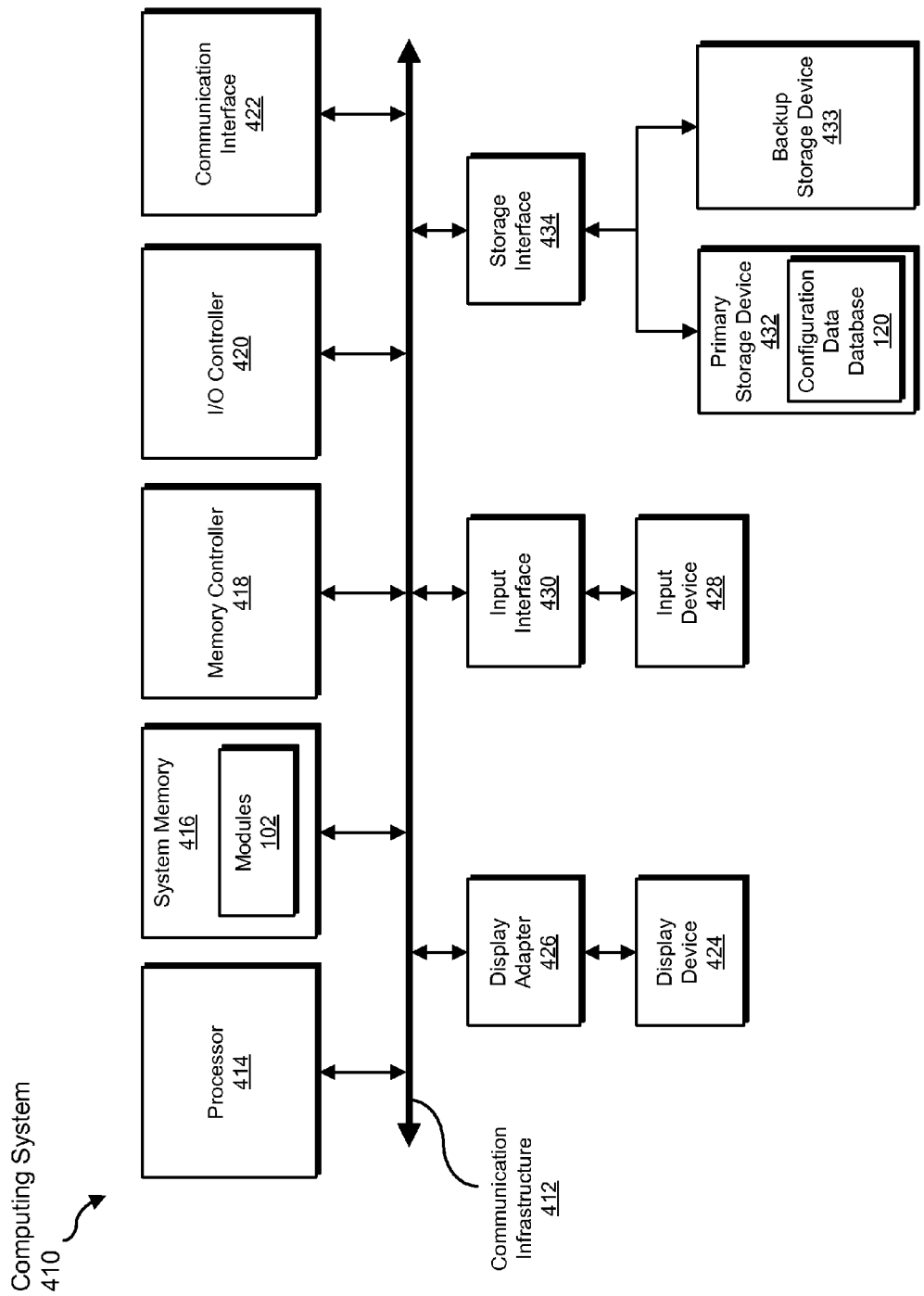
FIG. 4 is a block diagram of an exemplary computing system capable of implementing one or more of the embodiments described and/or illustrated herein.

FIG. 4 is a block diagram of an exemplary computing system 410 capable of implementing one or more of the embodiments described and/or illustrated herein. Computing system 410 broadly represents any single or multi-processor computing device or system capable of executing computer-readable instructions. Examples of computing system 410 include, without limitation, workstations, laptops, client-side terminals, servers, distributed computing systems, handheld devices, or any other computing system or device. In its most basic configuration, computing system 410 may include at least one processor 414 and a system memory 416.

Processor 414 generally represents any type or form of processing unit capable of processing data or interpreting and executing instructions. In certain embodiments, processor 414 may receive instructions from a software application or module. These instructions may cause processor 414 to perform the functions of one or more of the exemplary embodiments described and/or illustrated herein. For example, processor 414 may perform and/or be a means for performing, either alone or in combination with other elements, one or more of the identifying, copying, detecting, restoring, executing, receiving, taking, determining, monitoring, and/or merging steps described herein. Processor 414 may also perform and/or be a means for performing any other steps, methods, or processes described and/or illustrated herein.

System memory 416 generally represents any type or form of volatile or non-volatile storage device or medium capable of storing data and/or other computer-readable instructions. Examples of system memory 416 include, without limitation, random access memory (RAM), read only memory (ROM), flash memory, or any other suitable memory device. Although not required, in certain embodiments computing system 410 may include both a volatile memory unit (such as, for example, system memory 416) and a non-volatile storage device (such as, for example, primary storage device 432, as described in detail below). In one example, one or more of modules 102 from FIG. 1 may be loaded into system memory 416.

In certain embodiments, exemplary computing system 410 may also include one or more components or elements in addition to processor 414 and system memory 416. For example, as illustrated in FIG. 4, computing system 410 may include a memory controller 418, an Input/Output (I/O) controller 420, and a communication interface 422, each of which may be interconnected via a communication infrastructure 412. Communication infrastructure 412 generally represents any type or form of infrastructure capable of facilitating communication between one or more components of a computing device. Examples of communication infrastructure 412 include, without limitation, a communication bus (such as an ISA, PCI, PCIe, or similar bus) and a network.

Memory controller 418 generally represents any type or form of device capable of handling memory or data or controlling communication between one or more components of computing system 410. For example, in certain embodiments memory controller 418 may control communication between processor 414, system memory 416, and I/O controller 420 via communication infrastructure 412. In certain embodiments, memory controller may perform and/or be a means for performing, either alone or in combination with other elements, one or more of the steps or features described and/or illustrated herein, such as identifying, copying, detecting, restoring, executing, receiving, taking, determining, monitoring, and/or merging.

I/O controller 420 generally represents any type or form of module capable of coordinating and/or controlling the input and output functions of a computing device. For example, in certain embodiments I/O controller 420 may control or facilitate transfer of data between one or more elements of computing system 410, such as processor 414, system memory 416, communication interface 422, display adapter 426, input interface 430, and storage interface 434. I/O controller 420 may be used, for example, to perform and/or be a means for performing, either alone or in combination with other elements, one or more of the identifying, copying, detecting, restoring, executing, receiving, taking, determining, monitoring, and/or merging steps described herein. I/O controller 420 may also be used to perform and/or be a means for performing other steps and features set forth in the instant disclosure.

Communication interface 422 broadly represents any type or form of communication device or adapter capable of facilitating communication between exemplary computing system 410 and one or more additional devices. For example, in certain embodiments communication interface 422 may facilitate communication between computing system 410 and a private or public network including additional computing systems. Examples of communication interface 422 include, without limitation, a wired network interface (such as a network interface card), a wireless network interface (such as a wireless network interface card), a modem, and any other suitable interface. In at least one embodiment, communication interface 422 may provide a direct connection to a remote server via a direct link to a network, such as the Internet. Communication interface 422 may also indirectly provide such a connection through, for example, a local area network (such as an Ethernet network), a personal area network, a telephone or cable network, a cellular telephone connection, a satellite data connection, or any other suitable connection.

In certain embodiments, communication interface 422 may also represent a host adapter configured to facilitate communication between computing system 410 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 422 may also allow computing system 410 to engage in distributed or remote computing. For example, communication interface 422 may receive instructions from a remote device or send instructions to a remote device for execution. In certain embodiments, communication interface 422 may perform and/or be a means for performing, either alone or in combination with other elements, one or more of the identifying, copying, detecting, restoring, executing, receiving, taking, determining, monitoring, and/or merging steps disclosed herein. Communication interface 422 may also be used to perform and/or be a means for performing other steps and features set forth in the instant disclosure.

As illustrated in FIG. 4, computing system 410 may also include at least one display device 424 coupled to communication infrastructure 412 via a display adapter 426. Display device 424 generally represents any type or form of device capable of visually displaying information forwarded by display adapter 426. Similarly, display adapter 426 generally represents any type or form of device configured to forward graphics, text, and other data from communication infrastructure 412 (or from a frame buffer, as known in the art) for display on display device 424.

As illustrated in FIG. 4, exemplary computing system 410 may also include at least one input device 428 coupled to communication infrastructure 412 via an input interface 430. Input device 428 generally represents any type or form of input device capable of providing input, either computer or human generated, to exemplary computing system 410. Examples of input device 428 include, without limitation, a keyboard, a pointing device, a speech recognition device, or any other input device. In at least one embodiment, input device 428 may perform and/or be a means for performing, either alone or in combination with other elements, one or more of the identifying, copying, detecting, restoring, executing, receiving, taking, determining, monitoring, and/or merging steps disclosed herein. Input device 428 may also be used to perform and/or be a means for performing other steps and features set forth in the instant disclosure.

As illustrated in FIG. 4, exemplary computing system 410 may also include a primary storage device 432 and a backup storage device 433 coupled to communication infrastructure 412 via a storage interface 434. Storage devices 432 and 433 generally represent any type or form of storage device or medium capable of storing data and/or other computer-readable instructions. For example, storage devices 432 and 433 may be a magnetic disk drive (e.g., a so-called hard drive), a floppy disk drive, a magnetic tape drive, an optical disk drive, a flash drive, or the like. Storage interface 434 generally represents any type or form of interface or device for transferring data between storage devices 432 and 433 and other components of computing system 410. In one example, configuration data database 120 from FIG. 1 may be stored in primary storage device 432.

In certain embodiments, storage devices 432 and 433 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 432 and 433 may also include other similar structures or devices for allowing computer software, data, or other computer-readable instructions to be loaded into computing system 410. For example, storage devices 432 and 433 may be configured to read and write software, data, or other computer-readable information. Storage devices 432 and 433 may also be a part of computing system 410 or may be a separate device accessed through other interface systems.

In certain embodiments, storage devices 432 and 433 may be used, for example, to perform and/or be a means for performing, either alone or in combination with other elements, one or more of the identifying, copying, detecting, restoring, executing, receiving, taking, determining, monitoring, and/or merging steps disclosed herein. Storage devices 432 and 433 may also be used to perform and/or be a means for performing other steps and features set forth in the instant disclosure.

Many other devices or subsystems may be connected to computing system 410. Conversely, all of the components and devices illustrated in FIG. 4 need not be present to practice the embodiments described and/or illustrated herein. The devices and subsystems referenced above may also be interconnected in different ways from that shown in FIG. 4. Computing system 410 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 410. All or a portion of the computer program stored on the computer-readable medium may then be stored in system memory 416 and/or various portions of storage devices 432 and 433. When executed by processor 414, a computer program loaded into computing system 410 may cause processor 414 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 410 may be configured as an application specific integrated circuit (ASIC) adapted to implement one or more of the exemplary embodiments disclosed herein.

Figure 5:
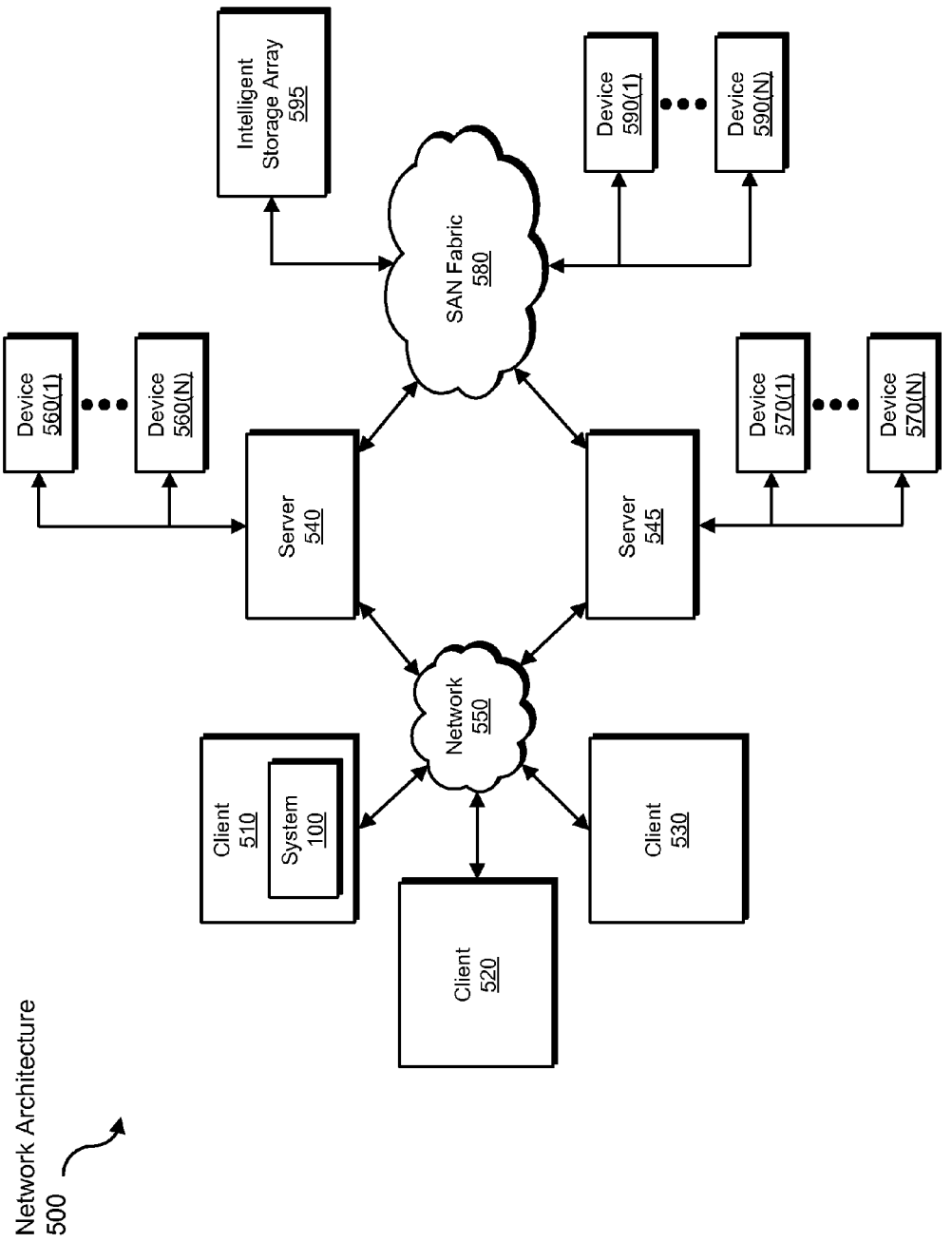
FIG. 5 is a block diagram of an exemplary computing network capable of implementing one or more of the embodiments described and/or illustrated herein.

FIG. 5 is a block diagram of an exemplary network architecture 500 in which client systems 510, 520, and 530 and servers 540 and 545 may be coupled to a network 550. Client systems 510, 520, and 530 generally represent any type or form of computing device or system, such as exemplary computing system 410 in FIG. 4. In one example, client system 510 may include system 100 from FIG. 1.

Similarly, servers 540 and 545 generally represent computing devices or systems, such as application servers or database servers, configured to provide various database services and/or run certain software applications. Network 550 generally represents any telecommunication or computer network including, for example, an intranet, a wide area network (WAN), a local area network (LAN), a personal area network (PAN), or the Internet.

As illustrated in FIG. 5, one or more storage devices 560(1)-(N) may be directly attached to server 540. Similarly, one or more storage devices 570(1)-(N) may be directly attached to server 545. Storage devices 560(1)-(N) and storage devices 570(1)-(N) generally represent any type or form of storage device or medium capable of storing data and/or other computer-readable instructions. In certain embodiments, storage devices 560(1)-(N) and storage devices 570(1)-(N) may represent network-attached storage (NAS) devices configured to communicate with servers 540 and 545 using various protocols, such as NFS, SMB, or CIFS.

Servers 540 and 545 may also be connected to a storage area network (SAN) fabric 580. SAN fabric 580 generally represents any type or form of computer network or architecture capable of facilitating communication between a plurality of storage devices. SAN fabric 580 may facilitate communication between servers 540 and 545 and a plurality of storage devices 590(1)-(N) and/or an intelligent storage array 595. SAN fabric 580 may also facilitate, via network 550 and servers 540 and 545, communication between client systems 510, 520, and 530 and storage devices 590(1)-(N) and/or intelligent storage array 595 in such a manner that devices 590(1)-(N) and array 595 appear as locally attached devices to client systems 510, 520, and 530. As with storage devices 560(1)-(N) and storage devices 570(1)-(N), storage devices 590(1)-(N) and intelligent storage array 595 generally represent any type or form of storage device or medium capable of storing data and/or other computer-readable instructions.

In certain embodiments, and with reference to exemplary computing system 410 of FIG. 4, a communication interface, such as communication interface 422 in FIG. 4, may be used to provide connectivity between each client system 510, 520, and 530 and network 550. Client systems 510, 520, and 530 may be able to access information on server 540 or 545 using, for example, a web browser or other client software. Such software may allow client systems 510, 520, and 530 to access data hosted by server 540, server 545, storage devices 560(1)-(N), storage devices 570(1)-(N), storage devices 590(1)-(N), or intelligent storage array 595. Although FIG. 5 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 540, server 545, storage devices 560(1)-(N), storage devices 570(1)-(N), storage devices 590(1)-(N), intelligent storage array 595, or any combination thereof. All or a portion of one or more of the exemplary embodiments disclosed herein may also be encoded as a computer program, stored in server 540, run by server 545, and distributed to client systems 510, 520, and 530 over network 550. Accordingly, network architecture 500 may perform and/or be a means for performing, either alone or in combination with other elements, one or more of the identifying, copying, detecting, restoring, executing, receiving, taking, determining, monitoring, and/or merging steps disclosed herein. Network architecture 500 may also be used to perform and/or be a means for performing other steps and features set forth in the instant disclosure.

As detailed above, computing system 410 and/or one or more components of network architecture 500 may perform and/or be a means for performing, either alone or in combination with other elements, one or more steps of an exemplary method for managing application availability.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In certain embodiments, one or more of the software modules disclosed herein may be implemented in a cloud computing environment. Cloud computing environments may provide various services and applications via the internet. These cloud-based services (e.g., software as a service, platform as a service, infrastructure as a service, etc.) may be accessible through a web browser or other remote interface. Various functions described herein may be provided through a remote desktop environment or any other cloud-based computing environment. For example, data may be scanned, from, and/or to a cloud computing environment and/or one or more of modules 102 may operate in a cloud computing environment.

In addition, one or more of the modules described herein may transform data, physical devices, and/or representations of physical devices from one form to another. For example, systems presented herein may transform a computing device into a failover cluster node by deploying one or more modules described herein to the cluster node and by recovering configuration data to the node.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for managing application availability, at least a portion of the method being performed by a computing device comprising at least one processor, the method comprising:
    identifying an application running on a first cluster node of a failover cluster by receiving a request to stop the application;
    determining that the application is a non-cluster-aware application that is not configured to take advantage of failover capabilities in a traditional cluster environment;
    in response to determining that the application is not cluster aware, determining that configuration data of the application should be copied to a storage location accessible by a second cluster node of the failover cluster;
    in response to determining that the configuration data of the application should be copied to the storage location, copying the configuration data of the application to the storage location by taking a backup of the configuration data after the application is stopped;
    detecting failure of the first cluster node;
    restoring the configuration data to the second cluster node by copying the configuration data to a memory region that stores registry data for the application such that the application is configured with the configuration data on the second cluster node;
    executing the application on the second cluster node in accordance with the configuration data.

2. The method of claim 1, further comprising:
    receiving a request to start the application on the first cluster node, wherein:
        identifying the application running on the first cluster node comprises receiving the request to start the application;
        copying the configuration data of the application comprises taking an initial backup of the configuration data.

3. The method of claim 1, further comprising:
    determining that the configuration data of the application has changed, wherein copying the configuration data of the application is performed in response to the determination that the configuration data of the application has changed.

4. The method of claim 3, wherein determining that the configuration data of the application has changed comprises:

identifying a directory on the first cluster node that contains the configuration data of the application;
monitoring the directory on the first cluster node;
detecting a change to data in the monitored directory.

5. The method of claim 1, further comprising:
merging the restored configuration data with configuration data for the application that is already stored on the second cluster node at the time of the failure of the first cluster node as a result of the second cluster node executing an instance of the application at the time of the failure of the first cluster node.

6. The method of claim 1, wherein:
the application comprises a non-cluster-aware application that is not capable of maintaining a cluster heartbeat between nodes, is not capable of mirroring cluster information in real-time, and is not capable of changing a configuration data path.

7. A system for managing application availability, the system comprising:
an identification module programmed to:
identify an application running on a first cluster node of a failover cluster by receiving a request to stop the application;
determine that the application is a non-cluster-aware application that is not configured to take advantage of failover capabilities in a traditional cluster environment;
in response to determining that the application is not cluster aware, determining that configuration data of the application should be copied to a storage location accessible by a second cluster node of the failover cluster;
a monitoring module programmed to, in response to determining that the configuration data of the application should be copied to the storage location, copy the configuration data of the application to the storage location by taking a backup of the configuration data after the application is stopped;
a first cluster agent installed on the first cluster node and programmed to communicate with the monitoring module;
a second cluster agent installed on the second cluster node and programmed to:
detect failure of the first cluster node;
restore the configuration data to the second cluster node by copying the configuration data to a memory region that stores registry data for the application such that the application is configured with the configuration data on the second cluster node;
execute the application on the second cluster node in accordance with the configuration data;
at least one processor configured to execute the identification module, the monitoring module, the first cluster agent, and the second cluster agent.

8. The system of claim 7, wherein:
the first cluster agent is programmed to receive a request to start the application on the first cluster node;
the identification module is programmed to identify the application running on the first cluster node by receiving the request to start the application;
the monitoring module is programmed to copy the configuration data of the application by taking an initial backup of the configuration data.

9. The system of claim 7, wherein:
the first cluster agent is further programmed to determine that the configuration data of the application has changed;
the monitoring module is programmed to copy the configuration data of the application in response to the determination that the configuration data of the application has changed.

10. The system of claim 9, wherein the first cluster agent is programmed to determine that the configuration data of the application has changed by:
identifying a directory on the first cluster node that contains the configuration data of the application;
monitoring the directory on the first cluster node;
detecting a change to data in the monitored directory.

11. The system of claim 7, wherein:
the second cluster agent is further programmed to merge the restored configuration data with existing configuration data of the application that is already stored on the second cluster node by performing a differential merge of the restored configuration data and the existing configuration data such that the merged configuration data comprises a single copy of settings that are the same in the existing and restored configuration data and different copies of settings that are different in the existing and restored configuration data.

12. The system of claim 7, wherein:
the application comprises a non-cluster-aware application that is not designed to call cluster application programming interfaces.

13. A non-transitory computer-readable-storage medium comprising one or more computer-executable instructions that, when executed by at least one processor of a computing device, cause the computing device to:
identify an application running on a first cluster node of a failover cluster by receiving a request to stop the application;
determine that the application is a non-cluster-aware application that is not configured to take advantage of failover capabilities in a traditional cluster environment;
in response to determining that the application is not cluster aware, determine that configuration data of the application should be copied to a storage location accessible by a second cluster node of the failover cluster;
in response to determining that the configuration data of the application should be copied to the storage location, copy the configuration data of the application to the storage location by taking a backup of the configuration data after the application is stopped;
detect failure of the first cluster node;
restore the configuration data to the second cluster node by copying the configuration data to a memory region that stores registry data for the application such that the application is configured with the configuration data on the second cluster node;
execute the application on the second cluster node in accordance with the configuration data.

14. The non-transitory computer-readable-storage medium of claim 13, wherein the one or more computer-executable instructions are programmed to cause the computing device to:
receive a request to start the application on the first cluster node;
identify the application running on the first cluster node by receiving the request to start the application;
copy the configuration data of the application by taking an initial backup of the configuration data.

15. The non-transitory computer-readable-storage medium of claim 13, wherein the one or more computer-executable instructions are programmed to cause the computing device to:

determine that the configuration data of the application has changed;

copy the configuration data of the application in response to the determination that the configuration data of the application has changed.

16. The non-transitory computer-readable-storage medium of claim 15, wherein the one or more computer-executable instructions are programmed to cause the computing device to determine that the configuration data of the application has changed by:

identifying a directory on the first cluster node that contains the configuration data of the application;

monitoring the directory on the first cluster node;

detecting a change to data in the monitored directory.

17. The non-transitory computer-readable-storage medium of claim 13, wherein:

the application comprises a non-cluster-aware application that is not capable of mirroring cluster information in real-time.

* * * * *